E. E. WILLHITE.
TRACTOR ATTACHMENT.
APPLICATION FILED JAN. 23, 1918.
1,272,592.
Patented July 16, 1918.
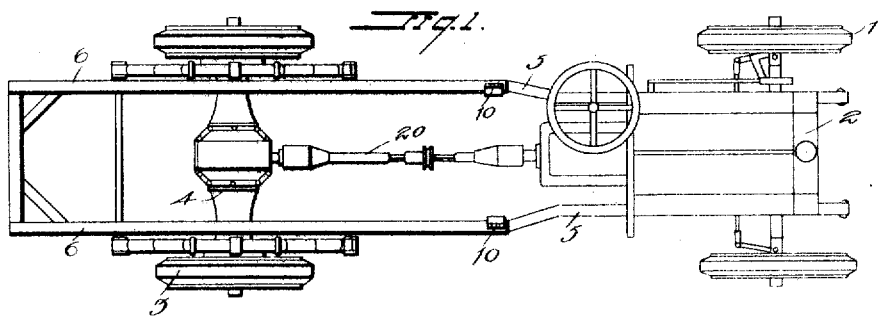
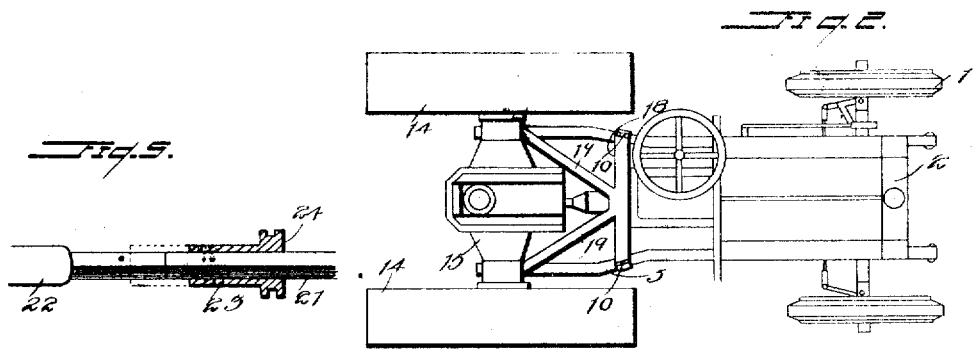
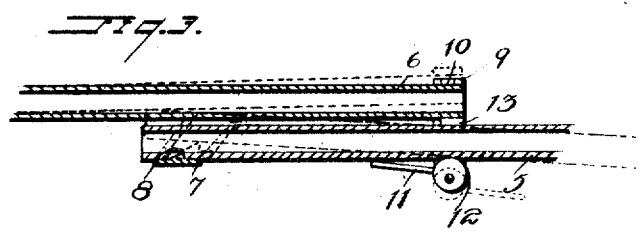
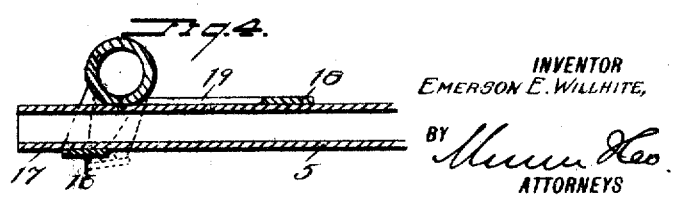
WITNESS
George C. Myers.
INVENTOR
EMERSON E. WILLHITE,
BY
ATTORNEYS

UNITED STATES PATENT OFFICE.

EMERSON E. WILLHITE, OF ALGONA, IOWA.

TRACTOR ATTACHMENT.

1,272,592.   Specification of Letters Patent.   Patented July 16, 1918.

Application filed January 23, 1918. Serial No. 213,292.

*To all whom it may concern:*

Be it known that I, EMERSON E. WILLHITE, a citizen of the United States, and a resident of Algona, in the county of Kossuth and State of Iowa, have invented certain new and useful Improvements in Tractor Attachments, of which the following is a specification.

My invention is an improvement in tractor attachments, and has for its object to provide mechanism in connection with a truck of any character for permitting the rear wheels, their connections and the rear end of the frame to be detached from the forward end, and to be replaced by the rear wheels and their mountings of a tractor.

In the drawings:

Figure 1 is a top plan view of a motor truck provided with the improvement;

Fig. 2 is a similar view showing the rear end of the truck detached and the rear end of the tractor in place;

Fig. 3 is a longitudinal section through the connection between the frame members of the truck;

Fig. 4 is a similar section through the connection between the frame and the axle housing of the tractor;

Fig. 5 is a side view, with parts in section, showing the connection between the sections of the transmission shaft.

In the present embodiment of the invention, the frame of the motor truck is composed of a forward portion and a rear portion, the front wheels 1, the motor 2 and associated parts being mounted on the front portion of the frame, while the rear wheels 3, the rear axle and its housing 4 and associated parts are mounted on the rear portion of the frame.

The frame, which consists of the usual channel shaped side members connected at the front and rear ends of the frame in the usual manner, has its side members divided into front sections 5 and rear sections 6, and these sections are detachably connected, so that the sections 6 with the rear wheels and associated parts may be removed from the front sections, with the front wheels, motor and associated parts.

As shown more particularly in Fig. 3, the two sections 5 and 6 of each side member of the frame are lapped upon each other, the section 6 lapping above the section 5, and this section 6 has a downwardly and rearwardly depending stirrup 7 through which the rear end of the section 6 is passed. This stirrup, which comprises a body portion extending beneath the section 5 and arms extending along the opposite sides of the section 5 and rigidly secured to the section 6, has on its body portion an upstanding lug 8 which engages a similarly shaped opening in the section 5, to prevent longitudinal movement of the sections with respect to each other.

A clamp is provided for clamping the forward end of the section 6 to the section 5. This clamp consists of a substantially U-shaped body 9 which is hinged to the member 6 as indicated at 10, and the arms of the clamp are adapted to pass down on each side of the section 5. A lever 11 is pivoted between the ends of the arms below the section 5, and this lever carries a cam shaped head 12, by means of which the parts may be forced tightly together.

It will be noticed from an inspection of Fig. 3 that the sections 5 and 6 are spaced slightly above each other by means of a spacing block 13 which is arranged between the sections at the forward end of the section 6. With this arrangement it is obvious that by loosening the clamp the front and rear portions of the frame may be easily detached. When the clamp is loosened and the sections 6 tilted upwardly at their forward ends, the rear ends of the sections 5 are disengaged from the lugs 8 and may be withdrawn from the stirrups and drawn out from the clamps 9.

The tractor attachment comprises the usual rear wheels 14 connected with the axle which is journaled in the housing 15 and, like the wheels 3, the wheels 14 are connected by a differential connection which is arranged at the center of the housing 15. The housing 15 has cylindrical portions at the wheels 14 and each of these cylindrical portions is provided with a stirrup 16 through which the adjacent section 5 may be passed, as shown in Fig. 4, to support the rear end of the said front frame portion.

The stirrup 16 extends downwardly and rearwardly as shown, and the body of the stirrup is provided with a spur or lug 17 which engages an opening in the frame section 5. It will be evident that when the front end of the tractor frame section is tilted upwardly the stirrup 16 will also be tilted forwardly at its lower end, to permit the easy disengagement of the frame section 5 from the lug 17.

The axle housing 15 of the tractor attachment has connected therewith a cross piece or bar 18 which is adapted to lap at its ends on the frame sections 5 as shown in Fig. 2, and the ends of this cross bar are provided with clamps 9 similar to those just described for engaging the frame sections 5, to clamp the cross bar to the frame sections. The cross bar 18 is connected to the housing 15 by inclined brace bars 19.

In Fig. 5 is shown the connection between the transmission shaft sections. The motor shaft is connected to the differential by a transmission shaft arranged in a housing 20, and this shaft is connected at its ends to the motor shaft and to the differential by universal joints in the usual manner. The shaft 20 is sectional and the sections are connected by the same mechanism shown in Fig. 5 which is also used for connecting the motor shaft to the differential when the tractor is in place. In this construction the motor shaft 21 is square at its outer end, as is also the differential shaft 22. When the tractor attachment is in place, the ends of the shafts 21 and 22 are abutted as shown, and a sleeve 23 is slipped over the abutted ends, the sleeve having a bore square in cross section and fitting the ends of the shaft. This sleeve may be moved over the abutting ends of the sections in any usual or desired manner, as, for instance, by a lever engaging an annular groove in the enlarged end 24 of the sleeve.

In use, when it is desired to detach the rear portion of the truck frame and to attach the tractor, the clamps 9 are released, the rear portion of the frame is tilted upwardly at its front end, and the rear portion of the frame withdrawn from the front portion. The tractor attachment is moved into place, the rear ends of the frame section 5 being passed through the stirrup 16, with the front end of the tractor frame, that is, the cross bar 18, raised. After the stirrups are engaged with the frame sections the cross bar is lowered on to the frame sections 5 and the clamps are operated to clamp the frame sections to the cross bar. With this attachment a single power plant may be used with a truck or with a tractor, the device being easily converted from one to the other.

I claim:—

1. In combination, a motor truck comprising a frame and front and rear wheels supporting the frame, the side members of the frame being divided intermediate their ends and detachably connected, and a tractor section having depending stirrups at the ends of the axle housing through which the rear ends of the front sections of the side members are adapted to pass, and a detachable connection between each frame section and the adjacent stirrup, the detachable connection between the frame sections comprising stirrups on the rear sections through which the rear ends of the front sections are adapted to pass, and clamps on the front ends of the rear sections for engaging the front sections.

2. In combination, a motor truck comprising a frame and front and rear wheels supporting the frame, the side members of the frame being divided intermediate their ends and detachably connected, and a tractor section having depending stirrups at the ends of the axle housing through which the rear ends of the front sections of the side members are adapted to pass, and a detachable connection between each frame section and the adjacent stirrup.

3. In combination, a motor truck comprising a frame and front and rear wheels supporting the frame, the side members of the frame being divided intermediate their ends and detachably connected, a tractor section having depending stirrups at the ends of the axle housing through which the rear ends of the front sections of the side members are adapted to pass.

4. In combination, a motor truck comprising a frame and front and rear wheels supporting the frame, the side members of the frame being divided intermediate their ends and detachably connected, a tractor section having depending stirrups at the ends of the axle housing through which the rear ends of the front sections of the side members are adapted to pass, each stirrup having an upstanding lug, and the front frame sections having openings for engagement by the lugs.

5. In combination, in a motor vehicle, a frame divided intermediate its ends into front and rear sections, a detachable connection between the sections, and a tractor section for connection with the front section of the frame when the rear section of the frame is removed, said tractor section and rear section having depending stirrups for engagement by the front section, and having clamps for engaging the said section.

EMERSON E. WILLHITE.